(12) United States Patent
Ito et al.

(10) Patent No.: US 6,750,412 B2
(45) Date of Patent: Jun. 15, 2004

(54) PRESSURE SENSING SWITCH

(75) Inventors: Koji Ito, Aichi-ken (JP); Takeshi Tahara, Kariya (JP); Kazuya Tanaka, Nagoya (JP); Wataru Otake, Nagoya (JP)

(73) Assignee: Aisin Seiki Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/230,320

(22) Filed: Aug. 29, 2002

(65) Prior Publication Data
US 2003/0057071 A1 Mar. 27, 2003

(30) Foreign Application Priority Data
Aug. 29, 2001 (JP) .......................................... 2001-259884

(51) Int. Cl.7 ................................................ H01H 3/14
(52) U.S. Cl. ................................... 200/85 A; 200/85 R
(58) Field of Search ............................. 200/85 A, 85 R, 200/52 R, 332, 332.1, 172, 330, 47, 86.5

(56) References Cited

U.S. PATENT DOCUMENTS

| | | | |
|---|---|---|---|
| 4,678,058 A | * 7/1987 | Wooters | ...................... 180/273 |
| 5,162,626 A | * 11/1992 | Hutchison et al. | ......... 200/85 A |
| 5,618,056 A | 4/1997 | Schoos et al. | |
| 5,739,757 A | * 4/1998 | Gioutsos | ...................... 340/667 |
| 5,896,090 A | * 4/1999 | Okada et al. | ................ 340/667 |
| 6,289,747 B1 | 9/2001 | Billen et al. | |
| 6,359,245 B1 | * 3/2002 | Wahls | ....................... 200/52 R |

FOREIGN PATENT DOCUMENTS

| | | |
|---|---|---|
| JP | 10-206254 A | 8/1998 |
| WO | WO 99/39168 A1 | 8/1999 |

\* cited by examiner

Primary Examiner—L. Donovan
Assistant Examiner—K. Lee
(74) Attorney, Agent, or Firm—Burns, Doane, Swecker & Mathis, L.L.P.

(57) ABSTRACT

A pressure sensing switch which prevents the crack and damage when a stress is applied. The pressure-sensing switch extended in an X-Y-direction includes pressure sensing portions arranged in an X-direction and connection portion provided between the pressure sensing portions for connecting the pressure sensing portions. The connection portion includes a straight portion extended in X-direction and a straight portion formed by inverting both ends of the straight portion. The straight portion is deformed in a Y-direction for connecting to the pressure sensing portions.

16 Claims, 8 Drawing Sheets

PRESSURE SENSING SWITCH

This application is based on and claims priority under 35 U.S.C. §119 with respect to Japanese Application No. 2001, 259884 filed on Aug. 29, 2001, the entire content of which is incorporated herein by reference.

FIELD OF THE INVENTION

The present invention relates to a mechanical switch in which a plurality of electric conductors is mechanically contacted and separated by a pressure force. More particularly, the present invention pertains to a pressure-sensing switch configured as a sheet (i.e., flexible thin plate), which binary detects the existence of an object including an occupant on a seat.

BACKGROUND OF THE INVENTION

A known pressure-sensing switch is disclosed in Japanese Patent Laid-Open Publication No. H10-206254. As shown in FIG. 6, a pressure-sensing switch A includes a pressure detection member A1 and a film A2 for wrapping the pressure detection member A1. The pressure sensing switch A includes two pressure sensing members A3 which are arranged in a width direction (i.e., right, left direction of FIG. 6) and two connection members A4 provided for connecting the pressure sensing members A3, A3 each other. Each connection member A4 includes a U-shape portion A5 and a connection portion A6 extended from the U-shape portion A5 whose curve portion faces downward of FIG. 6 to be connected to the pressure-sensing member A3.

Provided that the pressure-sensing switch A is positioned as shown in FIG. 7 relative to a seat cushion A8 of the seat. The pressure-sensing switch A is provided under a cover (not shown) of the seat cushion A8. A portion of the pressure-sensing switch A (e.g., leg portion A7) is fixed to a cushion member A9 in the seat cushion A8 with a bonding agent. When a person sits on the seat cushion A8 or when an object is placed on the seat cushion A8, a central portion of a top surface of the cushion member A9 goes down to be deformed in perpendicular perspective direction of FIG. 7. In this case, the tension force is applied to the pressure-sensing switch A in its width direction (i.e., right, left direction of FIG. 7). The connection member A4 absorbs the tension force by deforming in the direction that the U-shape portion A5 is extended. FIG. 8a shows a normal configuration of the U-shape portion A5. FIG. 8b shows the configuration of the U-shape portion A5 under the stretched condition.

Notwithstanding, in this case, because the U-shape portion A5 is deformed in the direction to be stretched, there is a drawback that a crack may be generated in the U-shape portion A5 by repeating numbers of deformation.

A need thus exists for a pressure-sensing switch which improves the durability.

SUMMARY OF THE INVENTION

In light of the foregoing, the present invention provides a pressure sensing switch extended in an X-Y plane surface, the pressure sensing switch including at least a pressure detection member and a film for wrapping the pressure detection member, which includes at least a pair of first pressure sensing portions arranged in an X-direction and at least one connection portion provided between the first pressure sensing portions for connecting the first pressure sensing portions one another. The first connection portion includes a first straight portion extended in the X-direction and second straight portions formed by inverting both ends of the first straight portion. Each one end of the second straight portions is further inverted for connecting to each first pressure sensing portion.

According to another aspect of the present invention, a pressure sensing switch extended in an X-Y direction, the pressure sensing switch including at least a pressure detection member and a film for wrapping the pressure detection member, which includes at least a pair of pressure sensing portions, at least a pair of first pressure sensing band extended in an X-direction in the pressure sensing portions, and at least one first connection portion for connecting the pair of first pressure sensing bands. The first connection portion includes a first straight portion extended in the X-direction and second straight portions formed by inverting both ends of the first straight portion. The second straight portions are further inverted for connecting the first connection portion and the first pressure sensing bands.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Embodiments of a pressure-sensing switch will be explained with reference to drawing figures as follows.

Figure 1:
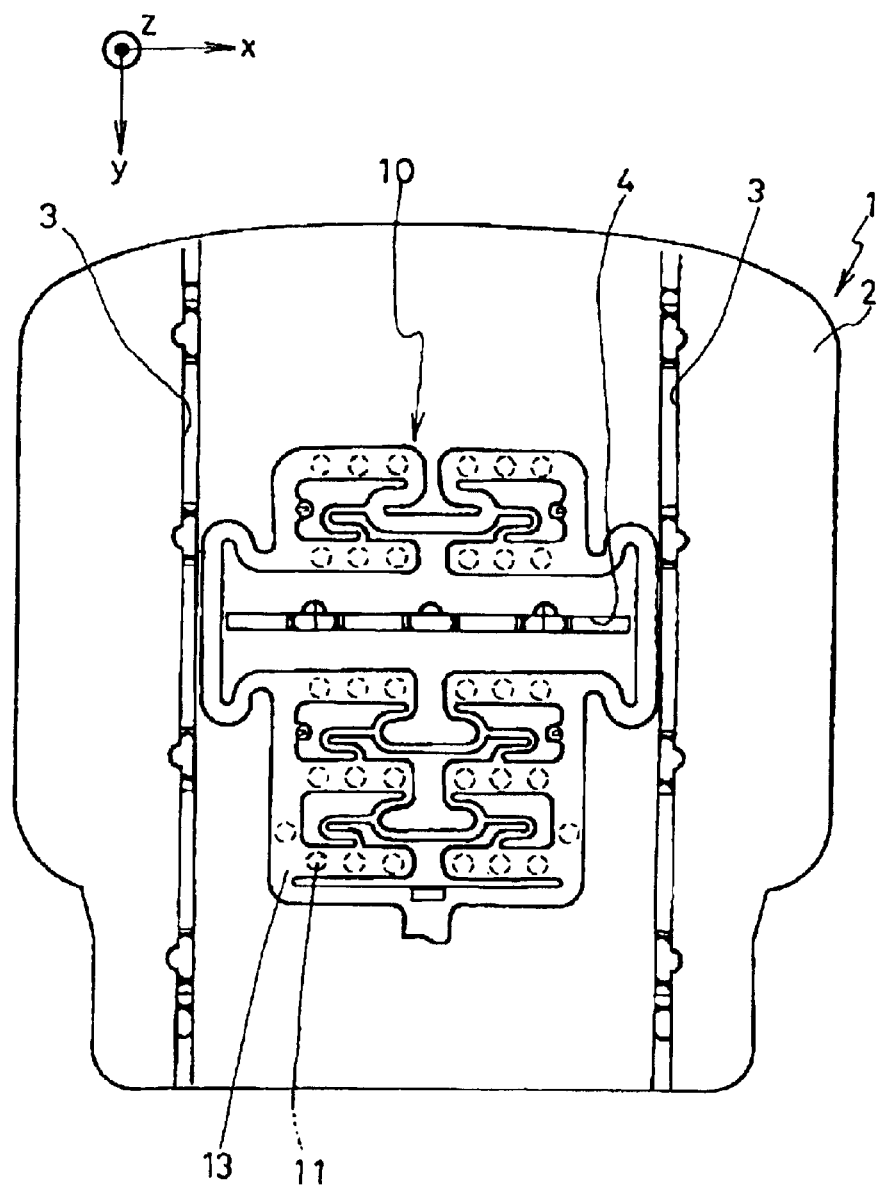
FIG. 1 is an overview of a pressure-sensing switch which is provided on a seat cushion of a seat according to a first embodiment of the present invention.

As shown in FIG. 1, a pressure-sensing switch 10 is provided on a top surface of a cushion member 2 in a seat cushion 1 of a seat. The pressure-sensing switch 10 is positioned between two grooves 3 which are extended in a Y-direction on the top of the cushion member 2. A wire is provided along each groove 3 for fixing a seat cover (not shown). A portion of the pressure-sensing switch 10 is fixed to the cushion member 2 with the bonding agent. The pressure-sensing switch 10 includes a plurality of sensor cells 11 serving as a pressure detection member and a pattern (not shown) for connecting each sensor cell 11 for transmitting the electric signal from the sensor cell 11. The sensor cell 11 and the pattern are sandwiched by multi-layered film 13 which is made of polyethylene naphthalete (i.e., PEN) from both surfaces in perpendicular direction (i.e., Z direction) of the X-Y plane surface. The sensor cell 11 includes a known surface pressure detection structure which is provided with pressure sensing ink (not shown) in which the electric resistance value is varied proportional to a surface pressure value applied in the Z-direction. The detected surface pressure value is transmitted to an external device such as CPU of the pressure-sensing switch 10.

Figure 2:
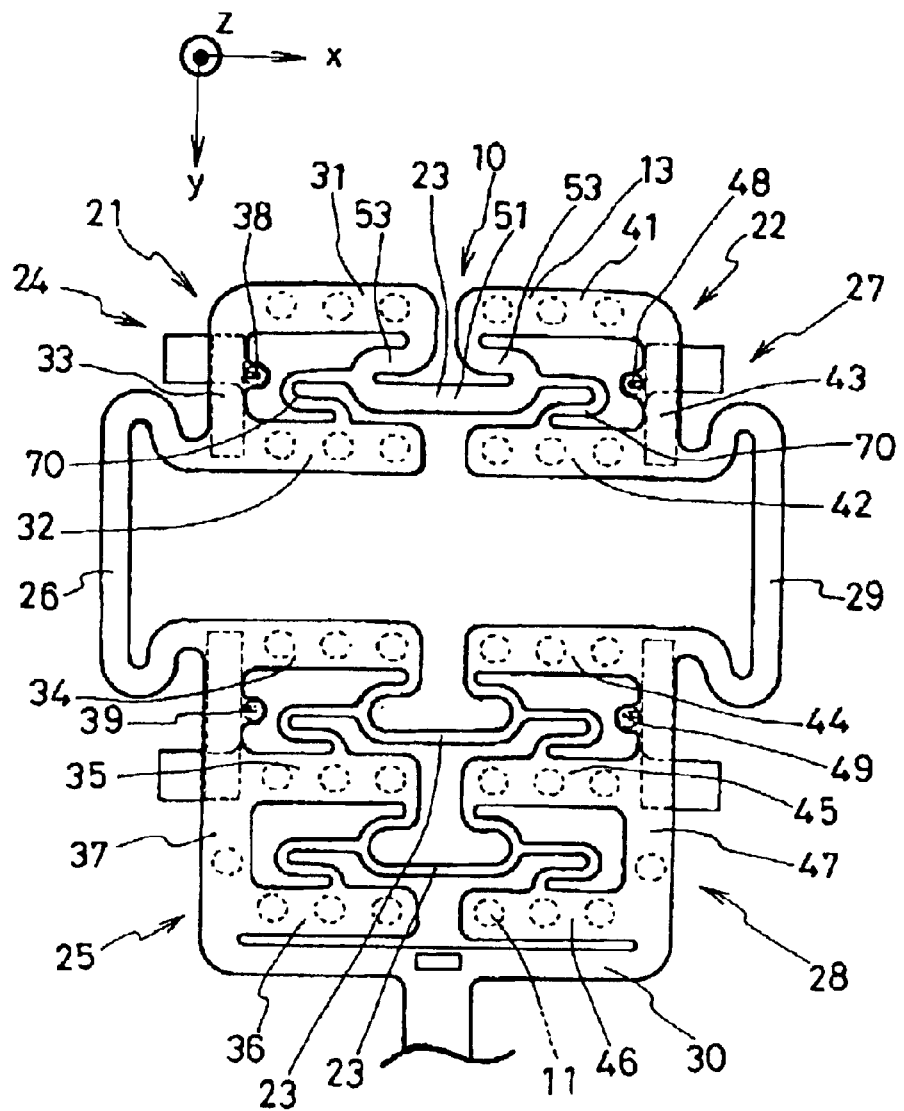
FIG. 2 is a plan view of the pressure-sensing switch according to the first embodiment of the present invention.

As shown in FIG. 2, the pressure-sensing switch 10 includes two detection portions 21, 22 (i.e., a first pressure sensing portion) arranged in X-direction (i.e., right, left direction of the cushion member 1). By the extension of the film 13 of the detection portions 21, 22, a connection portion 23 (i.e., a first connection portion) for connecting the detection portion 21 and the detection portion 22 is formed.

The detection portions 21, 22 are line symmetry each other having a central line in X-direction of the pressure sensing switch 10 as a reference axis. The detection portion 21 includes two detection portions 24, 25 (i.e., a second pressure sensing portion) arranged in the Y-direction. By the extension of the film 13 of the detection portions 24, 25, a connection portion 26 (i.e., a second connection portion) for connecting the detection portion 24 and the connection portions 25 is formed. Likewise the detection portion 21, the detection portion 22 includes detection portions 27, 28 arranged in the Y-direction and a connection portion 29 for connecting the detection portions 27, 28. As shown in FIG. 1, a groove 4 extended in the X-direction is provided on the top surface of the cushion member 2 between the detection portions 24, 25 and between the detection portions 27, 28. In other words, the pressure-sensing switch 10 is positioned avoiding the grooves 3, 4 of the cushion member 2. Likewise the groove 3, the groove 4 is provided with a wire for fixing the seat cover.

The detection portion 24 includes two pressure-sensing bands 31, 32 which are extended in the X-direction and a pressure-sensing band 33 extended in the Y-direction on left end of FIG. 2. The detection portion 25 includes three pressure-sensing bands 34, 35, 36 extended in the X-direction and a pressure-sensing band 37 which is extended in the Y-direction on the left end of FIG. 1. Likewise, the detection portion 27 includes two pressure-sensing bands 41, 42 extended in the X-direction and a pressure-sensing band 43 which is extended in the Y-direction. The detection portion 28 includes three pressure-sensing bands 44, 45, 46 extended in the X-direction and a pressure-sensing band 47 extended in the Y-direction. In FIG. 1, the bottom surface of the pressure sensing bands 33, 37, 43, 47 extended in the Y-direction is fixed on the top surface of the cushion member 2.

On the detection portions 24, 25, 27, 28, all pressure-sensing bands extended in the X-direction include three sensor cells 11 respectively. The pressure sensing bands 33, 43 extended in the Y-direction include ear portions 38, 48 formed facing the center in the X-direction of the pressure-sensing switch 10 in approximately central portion in Y-direction. Each ear portion 38, 48 are provided with the sensor cell 11. The pressure sensing bands 37, 47 are formed with ear portions 39, 49 respectively on topside in the Y-direction. The sensor cell 11 is provided on each ear portion 39, 49 and on bottom portion of the pressure sensing bands 37, 47 in the Y-direction respectively.

Figure 3:
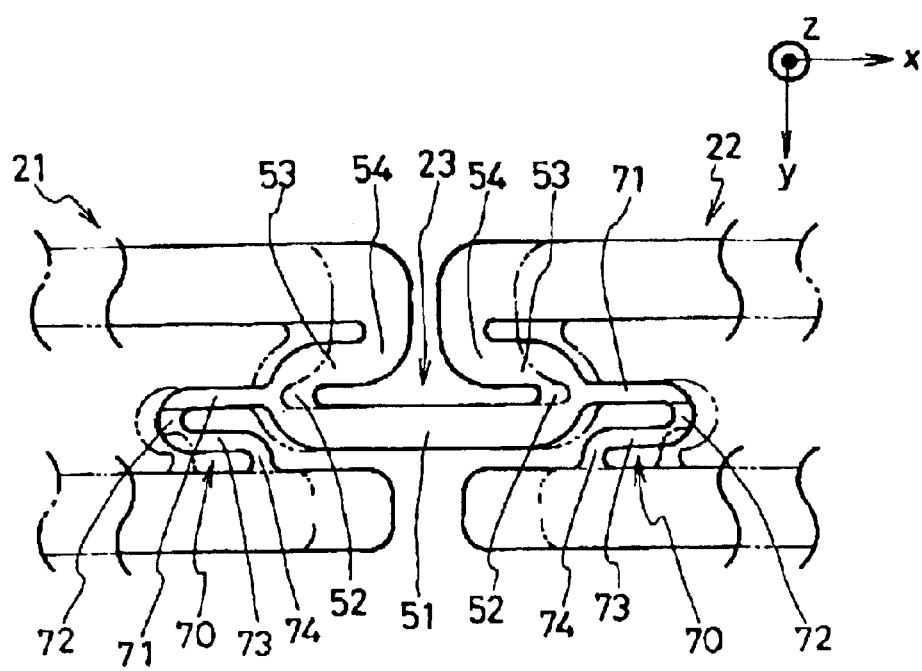
FIG. 3 is a partial magnified view of the pressure-sensing switch according to the first embodiment of the present invention.

As shown in FIG. 2, the connection portion 23 for connecting the detection portion 21 and the connection portion 22 has an ohm shape. Three connection portions 23 are provided for connecting the pressure sensing bands 31 and 41, for connecting the pressure sensing bands 34 and 44, and for connecting the pressure sensing bands 34 and 44 respectively. As shown in FIG. 3, the connection portion 23 includes a straight portion 51 (i.e., a first straight portion) extended in the X-direction, a U-shape portion 52, a straight portion 53 (i.e., a second straight portion) which is extended towards the center of the X-direction of the pressure sensing switch 10 from the U-shape portion 52, and a U-shape portion 54 for connecting the detection portion 21, 22. The pattern is provided in the film 13 on the connection portion 23 for connecting the pressure sensing bands 31 and 41 for electrically connecting the detection portion 21 and the detection portion 22. The pattern is not provided on any of connection portions 23 for connecting the pressure-sensing band 34 and the pressure sensing band 44 and or connecting the pressure-sensing portion 35 and the pressure-sensing portion 45. The sensor call 11 is provided on none of three connection portions 23.

Figure 4:
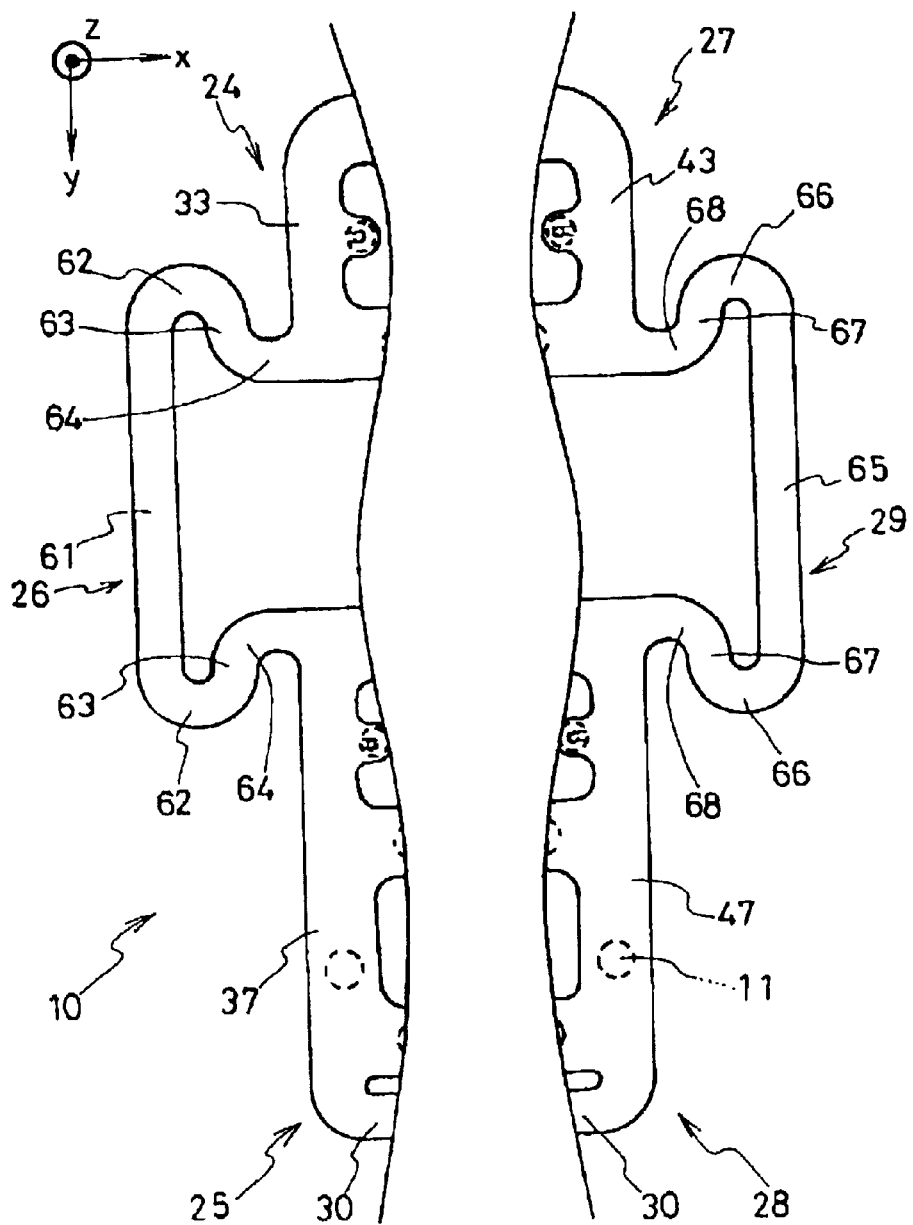
FIG. 4 is a partial magnified view of the pressure-sensing switch according to the first embodiment of the present invention.

As shown in FIG. 4, the connection portion 26 for connecting the detection portion 24 and the detection portion 25 has an ohm shape. One connection portion 26 is provided for connecting the pressure sensing band 33 and the pressure-sensing band 37. The connection portion 26 includes a straight portion 61 (i.e., a third straight portion) extended in the Y-direction, U-shape portions 62, straight portions 63 (i.e., a fourth straight portion) extended towards the center of the X-direction of the pressure sensing switch 10 from the U-shape portion, and a U-shape portion 64 connecting to the detection portion 24 and the detection portion 25 respectively. Likewise, the connection portion 29 for connecting the detection portion 27 and the detection portion 28 includes an ohm shape of line symmetry having an axis in the Y-direction and the connection portion 26 as an axis. One connection portion 29 is provided for connecting the pressure sensing band 43 and the connection-sensing portion 47. As shown in FIG. 4, the connection portion 29 includes a straight portion (i.e., the third straight portion) extended in the Y-direction, U-shape portions 66, straight portions 67 (i.e., the fourth straight portion) extended towards the center of the Y-direction from the U-shape portion 66, and U-shape portions 68 connecting to the detection portion 27 and the detection portion 28 respectively. The pattern is provided in the film 13 of the connection portion 26 for electrically connecting the detection portion 24 and the detection portion 25. The pattern provided in a base portion 30 extended in the X-direction on the bottom portion in the Y-direction of the pressure sensing switch 10 electrically connects the detection portion 25 and the detection portion 28. The pattern is not provided on the connection portion 29. The sensor cells 11 are not provided on the connection portions 26, 29.

As shown in FIG. 3, dummy portions 70 (i.e., a third connection portion) are provided between the connection portion 23 and the pressure sensing portions 21, 22 respectively. The connection portion 23 and the dummy portions 70 and the pressure sensing portions 21, 22 are connected by unitary forming the film 13. Each dummy portion 70 connects a pressure-sensing band, which is parallel in the X-direction, in the Y-direction. That is, as shown in FIG. 2, the pressure sensing bands 31, 41 are connected to the pressure sensing bands 32, 42 respectively via the connection portion 23 and the dummy portions 70. As shown in FIG. 3, the dummy portion 70 includes the configuration similar to the connection portion 23 and combining two dummy portions 70 appears the configuration likewise the connection portion 23 (i.e., the dummy portion 70 has a configuration that the connection portion 23 is divided into two pieces at a central line of the connection portion in the X-direction). The dummy portion 70 includes a straight portion 71, a straight portion 73, a U-shape portion 72, and a U-shape portion 74. The sensor cells 11 and the pattern are not provided on the dummy portions 70.

The operation of the pressure-sensing switch 10 is explained as follows. When the person sits on or the object is put on the seat cushion 1, approximately central portion of the cushion member 2 goes down to be deformed in the Z-direction. Bottom portion of the pressure sensing bands 33, 37, 43, 47 which are extended in the Y-direction of the pressure sensing switch 10 is fixed to the cushion member 2. Thus, the tension force is applied to the pressure-sensing switch 10 in the direction for separating the pressure-sensing portion 21 and the pressure-sensing portion 22 (i.e., X-direction). The condition around the connection portion 23 in this case is shown with a dotted line of FIG. 3. The tension force is transmitted to the connection portion 23 to be applied for stretching the connection portion 23 in the X-direction. The straight portion 51 and the straight portions 53 of the connection portion 23 are deformed in the perpendicular direction of the X-Y surface (i.e., Z-direction) having the U-shape portion 52 as a fulcrum. That is, the U-shape portion 52 is deformed being twisted in the Z-direction. The deformation of the pressure-sensing switch 10 in the Z-direction is apt to be generated considering the flexibility of the film 13. Thus, compared with the case that the pressure-sensing switch is deformed in the X-Y surface, the crack of the U-shape portion 52 is unlikely caused with this construction. The straight portion 53 and the pressure sensing bands 31, 41, 34, 44, 35, 45 are deformed in the Z-direction having the U-shape portion 54 as a fulcrum. That is, the U-shape portion 54 is deformed being twisted in the Z-direction. Because the deformation of the U-shape portion 54 in the Z-direction is apt to be generated considering the flexibility of the film 13, the crack is unlikely caused in the U-shape portion 54.

The contraction deformation of the cushion member 2 due to the occupation of the seat by the person causes the tension for stretching the detection portions 24, 25 of the detection portion 21 in the Y-direction. The tension force is transmitted to the connection portion 26. The straight portions 61, 63 are deformed to be stretched in the Z-direction having the U-shape portion 62 as a fulcrum. The straight portion 63 and the pressure sensing portions 33, 37 are deformed to be stretched in the Z-direction as the U-shape portion 64 as a fulcrum. Because this deformation is apt to be generated, the crack of the U-shape portion 64 is unlikely caused. Likewise, the crack of the connection portion 29 for connecting the pressure-sensing portion 27 and the pressure-sensing portion 28 of the pressure-sensing portion 22 is unlikely caused.

The dummy portion 70 connects, for example, the pressure sensing band 31 and the pressure-sensing band 32, which are parallel in the X-direction, in the Y-direction. Thus, the pressure-sensing switch 10 can be treated as one plane unit when fixing the pressure-sensing switch 10 to the cushion member 2. The dummy portion 70 is configured similar to the connection portion 23. Thus, the straight portions 71, 73 are deformed to be stretched in the Z-direction having the U-shape portion 72 therebetween as a fulcrum relative to the tension force in the direction for separating the pressure sensing portion 21 and the pressure sensing portion 22. Further, the straight portions 71, 73 are deformed to be stretched in the Z-direction having the U-shape portion 74 as a fulcrum between the straight portions 73 and the pressure sensing portions 32, 42, 35, 45, 36, 46 respectively. This deformation is apt to be generated and the crack of the U-shape portion 74 and the U-shape portion 72 is unlikely caused.

The sensor cells 11 are not provided on the connection portions 23, 26, 29 and the dummy portion 70 which are easily deformed. Thus, the detection of the pressure sensing is not influenced by the deformation of the pressure-sensing switch 10 and the precision of the pressure-sensing switch 10 is improved.

Figure 5:
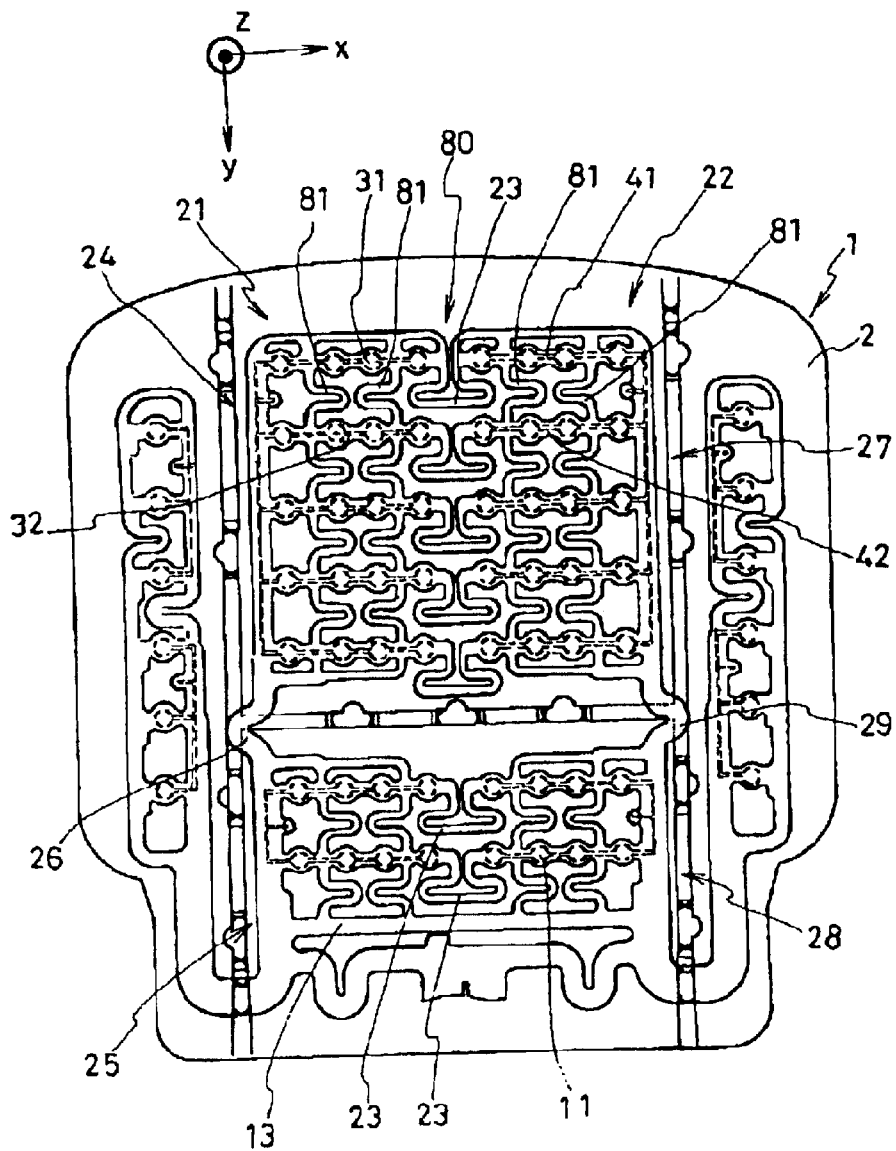
FIG. 5 is an overview of a pressure-sensing switch which is provided on a seat cushion of a seat according to a second embodiment of the present invention.
Figure 6:
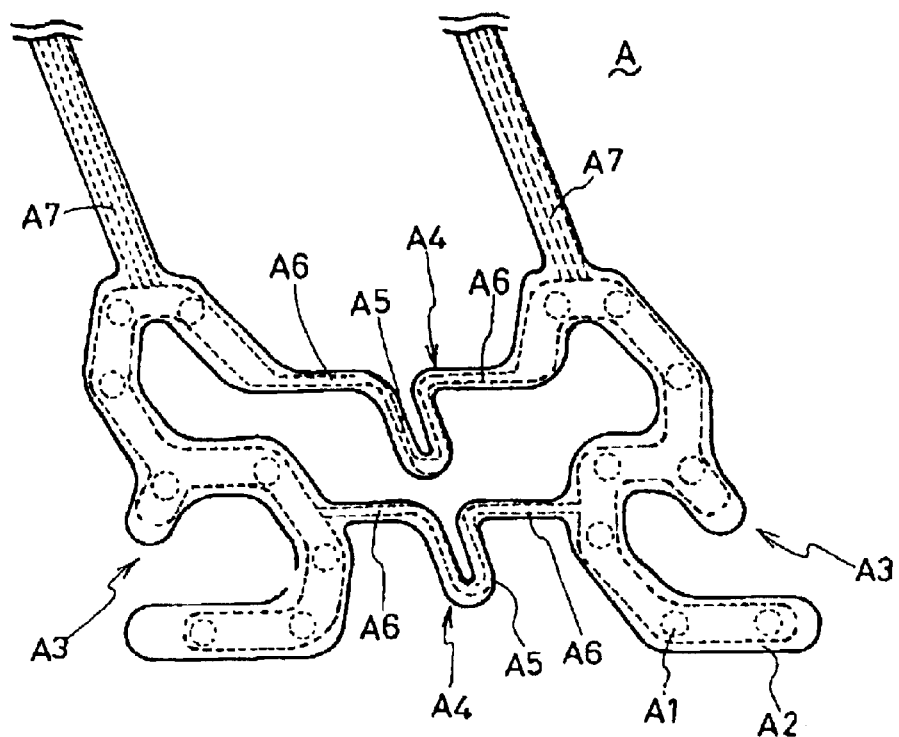
FIG. 6 is a perspective view showing an external appearance of a known pressure-sensing switch.
Figure 7:
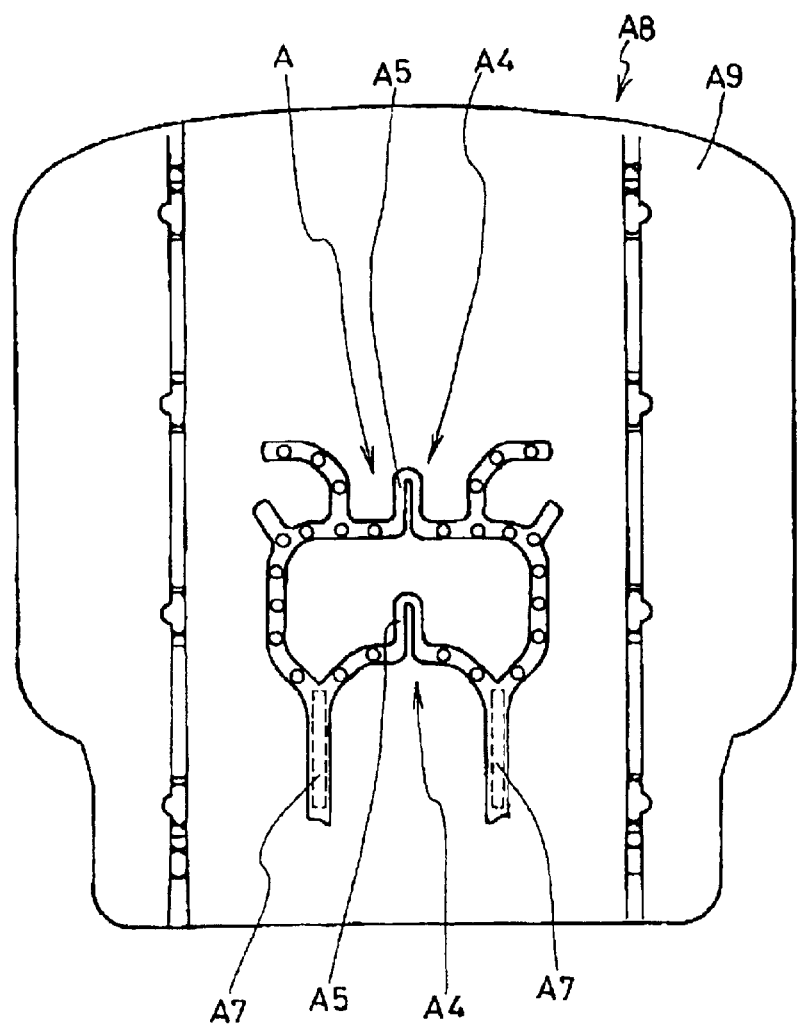
FIG. 7 is an overview of the known pressure-sensing switch which is provided on a seat cushion of a seat.
Figure 8A:
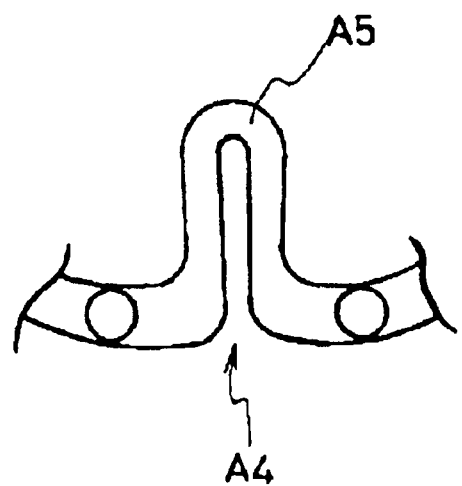
FIG. 8 is a view of the known pressure-sensing switch which is deformed when the stress is applied.
Figure 8B:
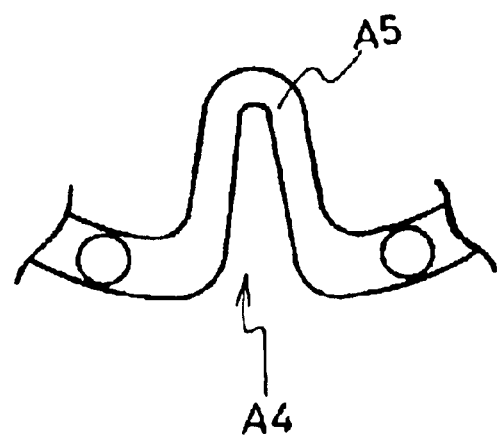

A second embodiment of the pressure-sensing switch according to the present invention is shown in FIG. 5. FIG. 5 shows a pressure-sensing switch 80. The same numerals are provided on members and portions corresponding to the pressure-sensing switch 10 of the first embodiment. The number of the pressure sensing bands which are parallel in the X-direction is different from the number of the pressure-sensing switch 10. In this case, a dummy portion 81 (i.e., a fourth connection portion) connects the pressure sensing bands, which are parallel in the X-direction, in the Y-direction. For example, two dummy portions 81 are connected in the Y-direction between the pressure-sensing band 31 and the pressure-sensing band 32. Thus, the pressure-sensing switch 80 can be treated as one plane unit when fixing the pressure-sensing switch 80 to the cushion member 2 and the operability when fixing the pressure-sensing switch 80 to the cushion member 2 is improved.

With the embodiments of the pressure-sensing switch according to the present invention, the connection portion for connecting the pressure sensing potions of the pressure-sensing switch is unlikely damaged when applying the pressure-sensing switch to the seat. Thus, the durability of the pressure-sensing switch is improved.

With the embodiments of the pressure-sensing switch according to the present invention, the operability when providing the pressure-sensing switch to the seat can be improved.

With the embodiments of the pressure-sensing switch according to the present invention, the member for detecting the pressures of the pressure-sensing switch is unlikely influenced by the deformation of the pressure-sensing switch when the pressure-sensing switch is applied to the seat. Thus, the durability and the precision of the pressure-sensing switch can be improved.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A pressure sensing switch extended in an X-Y plane surface, the pressure sensing switch including at least a pressure detection member and a film for wrapping the pressure detection member, comprising:

at least a pair of first pressure sensing portions arranged in an X-direction;

at least one connection portion provided between the first pressure sensing portions for connecting the first pressure sensing portions one another; the first connection portion including:
a first straight portion extended in the X-direction; and
second straight portions formed by inverting both ends of the first straight portion; wherein
each one end of the second straight portions is further inverted for connecting to each first pressure sensing portion.

2. A pressure sensing switch according to claim 1; wherein the first pressure-sensing portion has a plurality of second pressure sensing portions arranged in a Y-direction, and comprising:
a second connection portion provided between the second pressure sensing portions for connecting the second pressure sensing portions one another; the second connection portion including:
a third straight portion extended in the Y-direction; and
fourth straight portions formed by inverting both ends of the third straight portion; wherein each one end of the fourth straight portions is inverted in the X-direction for connecting to the second pressure sensing portions.

3. A pressure sensing switch according to claim 2 further comprising:
a plurality of pressure sensing bands extended in the X-direction on each first pressure sensing portion; and
a third connection portion for connecting the pressure sensing bands one another in a Y-direction.

4. A pressure-sensing switch according to claim 3, wherein the pressure detection members are provided on the pressure-sensing band.

5. A pressure sensing switch according claim 2, further comprising:
a pressure sensing band extended in the X-direction on each first pressure sensing portion; and
a fourth connection portion for connecting the pressure sensing band and the first connection portion in a Y-direction.

6. A pressure-sensing switch according to claim 5, wherein the pressure detection members are provided on the pressure-sensing band.

7. A pressure-sensing switch according to claim 2 further comprising:
a plurality of pressure sensing bands extended in the X-direction of the first pressure sensing portions; and wherein
the pressure detection members are provided on the first pressure sensing portions and the second pressure-sensing portions.

8. A pressure sensing switch according to claim 1 further comprising:
a plurality of pressure sensing bands extended in the X-direction on each first pressure sensing portion; and
a third connection portion for connecting the pressure sensing bands one another in a Y-direction.

9. A pressure-sensing switch according to claim 8, wherein the pressure detection members are provided on the pressure-sensing band.

10. A pressure sensing switch according claim 1, further comprising:
a pressure sensing band extended in the X-direction on each first pressure sensing portion; and
a fourth connection portion for connecting the pressure sensing band and the first connection portion in a Y-direction.

11. A pressure-sensing switch according to claim 10, wherein the pressure detection members are provided on the pressure-sensing band.

12. A pressure-sensing switch according to claim 1 further comprising:
a plurality of pressure sensing bands extended in the X-direction of the first pressure sensing portions; and wherein
the pressure detection members are provided on the first pressure sensing portions and the second pressure-sensing portions.

13. A pressure sensing switch extended in an X-Y direction, the pressure sensing switch including at least a pressure detection member and a film for wrapping the pressure detection member, comprising:
at least a pair of pressure sensing portions;
at least a pair of first pressure sensing band extended in an X-direction in the pressure sensing portions;
at least one first connection portion for connecting the pair of first pressure sensing bands;
the first connection portion including:
a first straight portion extended in the X-direction; and
second straight portions formed by inverting both ends of the first straight portion; wherein
the second straight portions are further inverted for connecting the first connection portion and the first pressure sensing bands.

14. A pressure sensing switch according to claim 13, further comprising:
at least a pair of second pressure sensing bands extended in a Y-direction in the pressure sensing portions;
at least one second connection portion for connecting the pair of second pressure sensing bands;
the second connection portion including:
a third straight portion extended in the Y-direction; and
fourth straight portions formed by inverting both ends of the second straight portion; wherein
the fourth straight portions are further inverted for connecting the second connection portion and the second pressure sensing bands.

15. A pressure-sensing switch according to claim 13, further comprising:
a third connection portion for connecting the first pressure-sensing band and the first connection portion in a Y-direction; the third connection portion including:
a fifth straight portion extended in the X-direction, one end thereof being connected to the first connection portion; and
a sixth straight portion extended in the X-direction and formed by inverting the other end of the fifth straight portion; wherein the sixth straight portion is further inverted to connect the third connection portion and the first pressure sensing band.

16. A pressure-sensing switch according to claim 13, further comprising:
a fourth connection portion for connecting the plural pressure sensing bands in an Y-direction; the fourth connection portion including:
a seventh straight portion extended in the X-direction, one end thereof is inverted to be connected to one of the plural first pressure bands; and
an eighth straight portion extended in the X-direction and formed by inverting the other end of the first straight portion; wherein the other end of the eights straight portion is inverted to be connected to the other of the plural first pressure sensing bands.

* * * * *